Louis W. Erath
INVENTOR.

BY
Arnold and Roylance
ATTORNEY

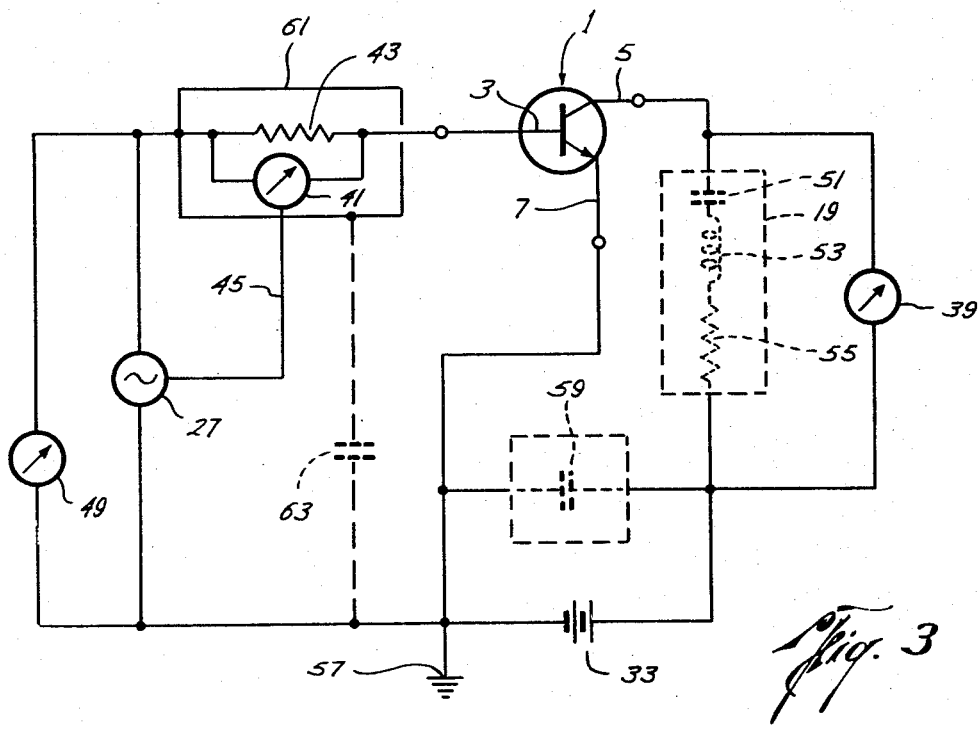
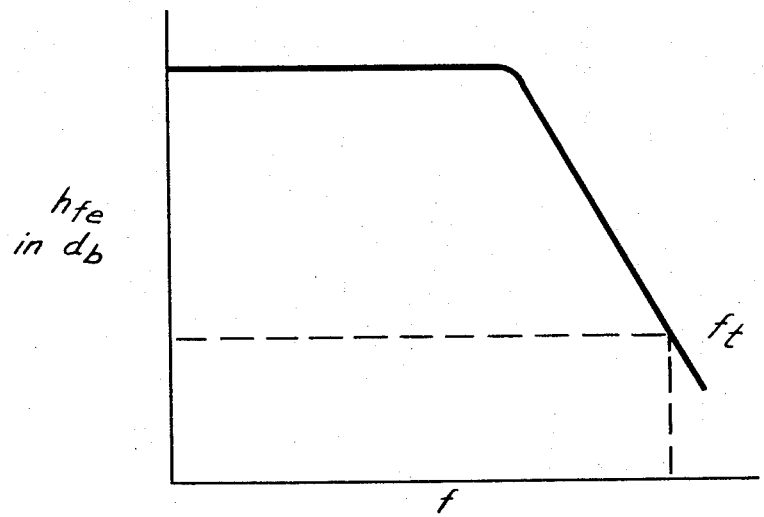

__

United States Patent Office 3,348,147
Patented Oct. 17, 1967

1

3,348,147
HIGH FREQUENCY SEMI-CONDUCTOR DEVICE TEST FIXTURE HAVING INDUCTIVE LOOP SIGNAL INJECTION MEANS
Louis W. Erath, Houston, Tex., assignor to Test Equipment Corporation, Houston, Tex., a corporation of Texas
Filed Apr. 1, 1965, Ser. No. 444,596
15 Claims. (Cl. 324—158)

This invention relates to improved high frequency measuring circuits and more particularly to test circuits for measuring parameters of active semi-conductor components under frequency conditions in the microwave range.

In predicting the operation of a particular transistor in a given circuit design problem, one of the most informative parameters useful to electronic engineers is the gain bandwidth product, conventionally designated as $f_t$.

Gain bandwidth product $f_t$ of a typical transistor triode is by definition equal to AC current gain, conventionally designated $h_{fe}$, times frequency, which must be in the operating frequency range of where $h_{fe}$ is decreasing with an increase in frequency. Typically, for transistors designed for operation at high frequencies, the lower limit of frequency at which $f_t$ may be measured may be in the microwave range.

The AC current gain $h_{fe}$ is, in turn, defined as the ratio of AC collector current, conventionally designated $i_c$, to the AC base current, conventionally designated $i_b$. Normally $h_{fe}$ is given in terms of decibels, although any convenient measuring term may be used.

Assuming that it is desirable to determine the $f_t$ parameter, as a practical matter conventional test circuits become unsuitable at the required high frequency test conditions because of the errors introduced by interelectrode and stray capacitances. In addition, special consideration must be given to the possible introduction of impedance to the test circuit by the various test meters and generators, further degrading the reliability of parameter measurements.

Some prior art structures include the use of a very small capacitor, on the order of 1 picofarad, for the introduction of the test driving signal as a constant current source. But, interelectrode capacitances are still comparable to such a value, having the effect of splitting significant currents and distorting the measurements.

Another technique used in measuring parameters under high frequency conditions is the shortening of the test transistor leads. This technique has the very real disadvantage of ruining the particular transistor for circuit connection in a subsequent practical application. If the measured transistor is taken as representative of its type, then there is a great deal of unsureness whether another transistor, even one of the same type, will have characteristics sufficiently similar to that of the measured one. In some applications, such as 100 percent quality control checking, such a technique is totally inapplicable.

In addition, bridge circuits have been used, such as shown in Rymasyewski 3,054,948, having variable components that may be used for nulling currents to allow reading of voltages. Obviously, for determining parameters based on current readings, such a technique is inapplicable.

Therefore, what is shown in one illustrated embodiment of the present invention is an apparatus for measuring circuit parameters at a microwave test frequency of a three-element transistor having base, collector, and emitter leads, comprising First, second and third tubular conductors each adapted to receive an internal lead, said first conductor receiving the emitter lead of the device, said second conductor receiving the collector lead of the device, and said third conductor receiving the base lead of the device such that the receiving end of each of said three conductors is essentially contiguous with the device, the length of said second conductor being substantially equal to one-quarter wavelength of the test frequency, the receiving ends of said first and second conductors being connected together, the receiving end of said third conductor being separated therefrom, said first, second and third conductors being connected together at a distance from the device so as to form an effective inductance loop; DC bias means adapted to be connected to the emitter lead of the device and said first conductor at the end of said first conductor opposite the device; oscillator means tuned to the measuring frequency adapted to be coaxially connected to said third conductor at a point near the end of said third conductor near the device; first current metering means having a terminal impedance substantially equal to the charactertistic impedance of said second conductor adapted to be connected between said third conductor and the base lead of the device at the end of said third conductor opposite the device; and second current metering means adapted to be connected between the collector lead of the device at the end of said third conductor opposite the device and said DC bias means; whereby the base current and collector current may be accurately measured for determining the AC current gain and hence the gain bandwidth product of the transistor.

Briefly, the illustrated embodiment of the present invention utilizes coaxial-type tubular conductors for isolating through shielding the leads depending from the transistor under test. Also, as is explained below in detail, the shields or outer conductors into which the leads are inserted, are arranged to form an inductance loop, thereby providing convenient means for inductively coupling the driving test signal to the test circuit without interfering with the circuit component values.

In addition, coaxial connectors of a length predetermined to be equal to a one-quarter wavelength of the test frequency is employed to reduce the resistance in the collector circuit from that value that would otherwise have to be present.

More particular description of the invention may be had by reference to the embodiment thereof which is illustrated in the appended drawings, which form a part of this specification. It is to be noted however, that the appended drawings illustrate only a typical embodiment of the invention and therefore is not to be considered limiting of its scope for the invention will admit to other equally effective embodiments.

In the drawings:

FIG. 3 is an equivalent schematic diagram showing many of the existing relationships of the embodiment of the invention illustrated in FIG. 2; and FIG. 4 is a graphical plot of AC current gain versus frequency for a typical transistor triode.

*Physical connections of one embodiment*

Figure 1:
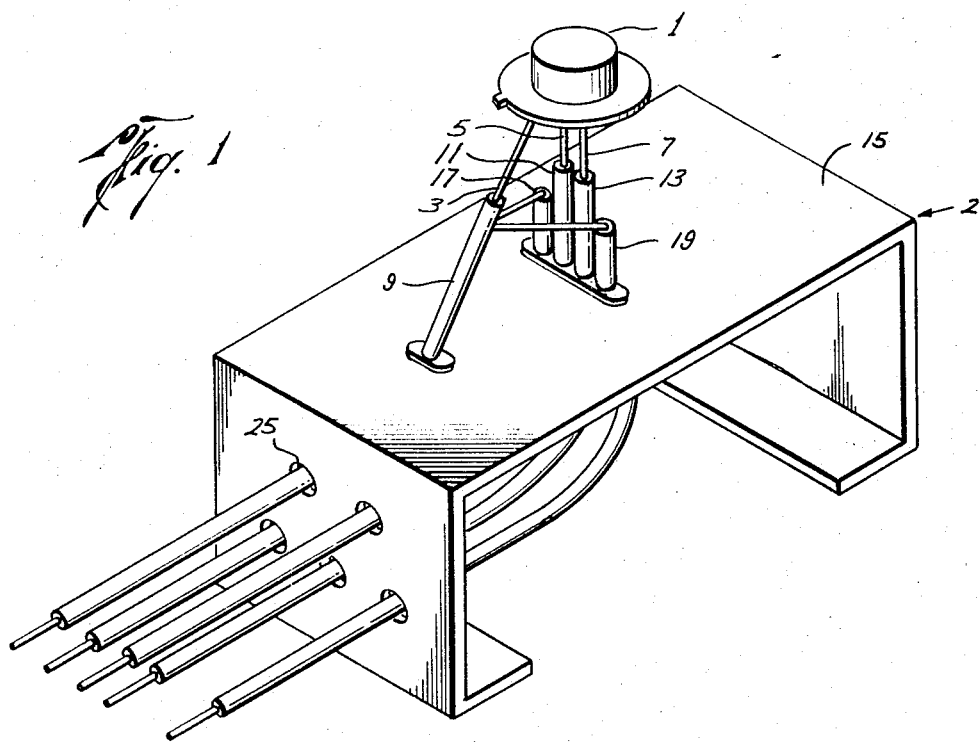
FIG. 1 is a partial isometric view of one embodiment of the invention.

Referring now to FIG. 1, a typical transistor 1 of a triode type is shown inserted into a test fixture 2 made in accordance with the present invention. Leads 3, 5, and 7 of transistor 1 under test are shown not quite seated into the receiving ends of mating tubular, coaxial-type shields 9, 11, and 13 for convenience of showing the leads and the various connections made at or near these receiving ends. As shown, transistor 1 selected for illustrative purposes is a conventional npn transistor triode comprising a base lead 3, a collector lead 5, and an emitter lead 7.

Receiving tubular shields 9, 11, and 13 may be made simply from standard coaxial conductors commonly used for connections in electronic circuits designed to operate under high frequency conditions by simply removing the internal leads therefrom. This adapts the shields to receive the leads from the transistor under test. Of course, other means for making the tubular shields are also available and equally as acceptable.

The outer shield or outer tubular conductor may be either of mesh or solid construction. However, fairly solid construction is preferred to limit RF radiation leakage.

As illustrated, tubular conductor 9 is adapted to receive base lead 3, tubular conductor 11 is adapted to receive collector lead 5, and tubular conductor 13 is adapted to receive emitter lead 7.

Collector tubular conductor 11 and emitter tubular conductor 13 are connected together mechanically by an essentially perfect electrical connection, such as by soldering, at their ends adapted to receive the collector and emitter leads. FIG. 1 illustrates the connection of conductors 11 and 13 for quite some distance from their receiving ends, even to the point where the conductors are inserted into mounted plate 15. Although this structure may be convenient, the two conductors only need be joined at their receiving ends.

Tubular conductor 9 must not be joined at its receiving end to conductors 11 and 13. As is shown, this conductor may conveniently take the appearance of having its receiving end spaced slightly apart, probably on the order of only a fraction of an inch, from the receiving ends of conductors 11 and 13 and slanted slightly away from these conductors until it enters mounting plate 15. For measuring frequencies of about 50–200 megacycles, the distance from the receiving ends of conductors 9, 11 and 13 to mounting plate 15 is on the order of one to two inches, although the distance is not at all critical.

Coaxial connectors 17 and 19 may be conveniently attached to tubular conductors 11 and 13 by soldering or otherwise, thereby achieving an essentially perfect electrical junction, by connecting their outer shields or jackets at points near the lead-receiving ends of the conductors. Although illustrated to give the appearance of connection the full distances along the lengths of connectors 17 and 19 from their free ends (where the internal conductors extend therefrom) to the point where the connectors enter mounting plate 15, such may not be necessarily the case. All that is necessary is the juncture of the shields as described above.

The ends of connectors 17 and 19 may be staggered or spaced longitudinally a short distance from the ends of the conductors 11 and 13 to allow a small amount of clearance for the internal conductors from connectors 17 and 19 to extend away from the underneath side of transistor 1.

Mounting plate 15 may be conveniently slitted or have convenient holes drilled therein for receiving all three tubular conductors, namely conductors 9, 11, and 13 and coaxial connectors 17 and 19 which are passed therethrough in the alignment above described. Conductors 11 and 13 and connectors 17 and 19 then may be joined to mounting plate 15 by solder bead 23, forming an essentially perfect electrical connection. Likewise, conductor 9 may be joined to plate 15 by solder bead 21.

From the underneath side of mounting plate 15, that is, the side of mounting plate 15 opposite the receiving ends of conductors 9, 11 and 13, the conductors and connectors may be further brought out through openings 25 to facilitate connection to externally-mounted equipment, discussed below.

To give physical stability and rigidity to the conductors and connectors projecting above mounting plate 15, an insulating auxiliary top plate (not shown) may be used. This plate may be conveniently attached so that the top surface of the top plate is flush with the receiving ends of conductors 9, 11 and 13. If more rigid support is desired, it is possible to bolt the top plate to mounting plate 15 via standoffs.

Such a plate provides means by which the ends of conductors 11 and 13 may be soldered, ensures the necessary insulation of the end of conductor 9, and gives support for the flexible conductors. Connectors 17 and 19 may conveniently be attached to conductors 9 just underneath the top plate.

Figure 2:
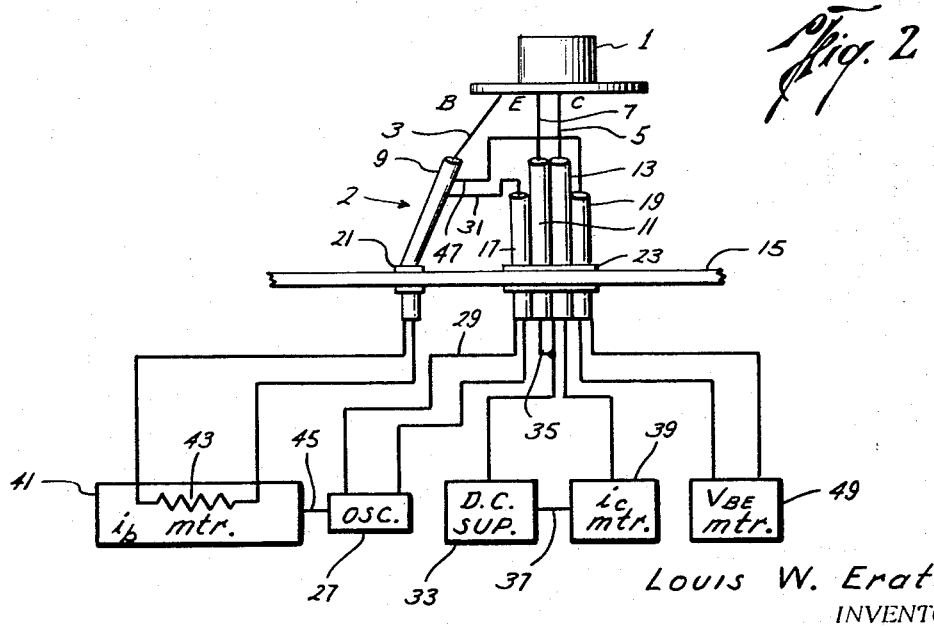
FIG. 2 is a plan view showing the interconnecting relationships of the major components of one embodiment of the invention.

FIG. 2 illustrates diagrammatically the test setup shown isometrically in FIG. 1. The various ancillary electronic circuits which may be used with the test fixture 2 are shown in the block diagram form. Again, for convenience of illustration, leads 3, 5, and 7 from transistor 1 under test are shown spaced apart from the receiving ends of the conductors, although in actual testing position, the transistor will be inserted into the conductors such that the underneath surface of transistor 1 from which leads 3, 5, and 7 depend is flush or contiguous with the ends of conductors 9, 11 and 13.

Although the actual physical arrangement of the conductors is more closely represented by the FIG. 1 illustration than by FIG. 2, FIG. 2 shows clearly the formation of the inductance loop by which the driving or test signal is applied to the setup. As shown, the loop comprises shield or conductor 9, that portion of the mounting plate between solder beads 21 and 23, and conductors 11 and 13.

Any convenient oscillator or generator means 27 capable of operating in the desired test frequency range may be connected to test fixture 2. The illustrated method for coupling the driving signal from means 27 to the circuit is the physical connection from oscillator 27 to the internal conductor lead 31 of connector 17. At the end of coaxial connector 17 near transistor 1, internal conductor 31 extends from the connector and is connected to tubular conductor 9 near its receiving end. As described above, if a top plate is used, this connection may conveniently be made just beneath the plate.

It should be noted that hereafter the terms "ground" and "grounded" are used to mean a common or neutral path at the same potential, which path may be at some potential other than ground potential in a particular chosen application.

The return neutral or ground path (assuming that mounting plate 15 is grounded) is through connection 29 from oscillator 27 to the outer coaxial shield of connector 17.

An alternate method of coupling the test signal to the circuit (not shown) may be the feeding of the signal to a closed loop path, which may then be brought into close proximity to the above-described inductance loop including the tubular conductors and the connecting portion of the mounting plate. When this method is employed, the oscillator signal is applied to the test circuit via transformer action of the exciting and excited loops.

Transistor 1 chosen for convenient illustrative purposes is an npn transistor, connected as a grounded emitter. In such a connection, the emitter lead 7 is connected to ground, which may be conveniently made by connecting lead 7, on the opposite side of mounting plate 15 from transistor 1 to its own surrounding conductor 11. In turn, conductor 11 may be conveniently grounded to plate 15 via solder bead 23 as described above.

To condition transistor 1 for proper operation, bias voltage may be applied from any convenient DC supply 33. The negative terminal of the DC supply may be conveniently connected to the circuit by connection to shield or conductor 11 and the positive terminal may be conveniently connected through connection 37 to $i_c$ meter 39, which, in turn, may be connected to collector lead 5.

Since the definitions of $f_t$ and $h_{fe}$ include meter readings of the base and collector currents, these connections may be considered next. Base current meter 41 may be any type of meter capable of reading currents in the microampere range. To achieve satisfactory coupling into the base circuit of transistor 1 under test without undue loading, the terminal impedance of meter 41 should be in the neighborhood of the characteristic impedance of conductor 9. For commonly known coaxial-type conductors that are readily available, this resistance is equal to approximately 50 ohms.

Meter 41 may be conveniently connected into the base circuit by attaching the negative lead thereof to conductor 9 on the side of mounting plate 15 opposite from transistor 1 and attaching the positive lead to the extending base lead 3. In one embodiment of this invention a feedback connection 45 may be made between meter 41 and oscillator 27.

As will be explained further below, conductor 13 may be cut to length to be substantially equal to one-quarter wavelength of the test or oscillator frequency. When this is done, the components connected to the end of the conductor opposite the side of mounting plate 15 where transistor 1 is inserted are reflected as only a very small value of impedance.

Collector current meter 39 may be any meter similar in construction in characteristics to the base current meter 41; however, there is no need for the terminal impedance to be any particular critical value since it may conveniently be connected into the circuit via conductor 13, cut to length as above described. The actual terminals of meter 39 may be connected to DC bias supply 33 via connection 37 and to collector lead 5 extending from conductor 13 on the side of mounting plate 15 opposite transistor 1.

Alternate methods suitable for coupling collector current meter 39 to the circuit are available. For instance, meter 39 may have a terminal impedance equal to that of the coaxial connector providing a termination similar to that described for meter 41. In this instance it should be noted that there is introduced into the collector circuit an impedance that changes the potential on the collector of transistor 1. In some cases, this is not of critical importance.

Finally, if it is desired to measure the base-to-emitter voltage (from which the input may be readily calculated), such measurement may be conveniently made through connector 19. Voltage meter 49 for taking this measurement may be any type of meter capable of measuring potential in the microvolt range and at frequencies in the megacycle range. Meter 49 may conveniently be connected across the base-emitter circuit by connecting the terminal thereof to the outer shield of connnector 19, which is grounded through solder bead 23, and the other terminal thereof to internal conductor 47 of connector 19 on the side of mounting plate 15 opposite transistor 1.

On the transistor side of plate 15, conductor 47 may be connected similarly to conductor 31, namely, to conductor 9 near the receiving end thereof.

Significance of $f_t$ parameter

Referring now to FIG. 4, a plot of the AC current gain, normally designated as $h_{fe}$, is shown versus frequency for a typical transistor triode designed to operate into the microwave frequency range. As explained above $h_{fe}$ is defined as the ratio of AC collector current $i_c$ to the AC base current $i_b$.

To appreciate the significance of the plot, it must be first understood that both the horizontal and vertical scales are logarithmic. The horizontal, or $x$, axis is merely the scale of frequencies over the operating range of the transistor, normally plotted in cycles per second or in convenient multiples thereof. The vertical, or $y$, axis is normally scaled in decibels, although a convenient multiple thereof may also be used.

As shown it is common for transistors to have a relatively constant value of $h_{fe}$ over a wide range of operating frequencies. However, at some high frequency, for instance 50 megacycles, the $h_{fe}$ no longer remains constant with an increase in frequency, rather it begins to decrease or drop off. Although the frequency at which this occurs varies with the particular transistor, it is axiomatic that once the decrease begins to occur it does so at a rate of 6 decibels per octave. Therefore, the slope of the curve in the high frequency range where the $h_{fe}$ is decreasing with an increase in frequency, the slope of the curve is constant at a predictable descending rate.

It is possible to predict what the $h_{fe}$ is at any frequency within a degree of accuracy suitable for most engineering applications by measuring $h_{fe}$ at only two frequencies. One of these frequencies would be in the range where the $h_{fe}$ is a constant value. The other would be in the high frequency range where the slope of $h_{fe}$ plotted against $f$ has become constant as described above.

Although it is possible to describe the $h_{fe}$ of a transistor together with a test frequency known to be in the high frequency range where the slope has become constant, it is conventionally more useful to describe the operating characteristic in terms of $f_t$, the gain bandwidth product. The gain bandwidth product is defined as the frequency where the AC current gain is unity.

As a practical matter, it is possible to determine $f_t$ by operating a test circuit at a frequency very much less than $f_t$ frequency, just so long as the test frequency selected is known to be in the range where the slope has become constant, for most transistors 100 mc. being considered to be safely such a frequency.

To allustrate how $f_t$ may be determined, consider the following example. If the AC base current $i_b$ is equal to 1 microampere and the AC collector circuit $i_c$ is equal to 5 microamperes, the $h_{fe}$ would be equal to 5. If the measurements were made under a chosen test frequency of 100 mc., then the $f_t$ of the transistor would be 500 mc., the frequency where $h_{fe}$ is equal to 1.

Schematic equivalent circuit

Although there are many interelations that are present and which are extremely difficult to show schematically, FIG. 3 is a satisfactorily equivalent circuit of the test setup described above.

As may be seen, an npn transistor 1 is shown connected into the test circuit having a base connection 3, a collector lead 5 and an emitter lead 7. The two measuring meters used to determine the value of $h_{fe}$, and hence the value of $f_t$, are base meter 41 and collector 39. As is readily apparent neither meter is inserted in series with their respective lead connection, so that there is no tendency to load down the circuit with the meter.

Base meter 41, for example, may be shown as being placed across its terminating impedance 43 and collector meter 39 may be shown as being placed across a quarter-wave stub 50 in the collector circuit and comprising a series combination of a capacitor 51, an inductor 53, and a resistor 55. As indicated above, when the length of the coaxial conductor surrounding the collector is chosen to be a quarter wavelength of the test frequency, the equivalent circuit values of capacitor 51 and inductor 53 are exactly equal there remaining only a resistance value 55. This resistance value 55 may be kept to an extremely small value of only a few ohms, essentially eliminating resistance from the collector circuit. By such a connection, the conditions closely satisfy the ideal situation in which resistance is eliminated altogether.

To explain further how a quarter wavelength coaxial connection achieves the elimination of impedance being reflected in the circuit, consider the following. As is well known, an open coaxial-type connector may be shown schematically as an equivalent circuit to be a series combination of a capacitor and an inductor. When a frequency is chosen such that the length of the coaxial-type connector is equal to one-quarter wavelength thereof, resonant values may be assigned to the components of the combination, thereby reflecting the combination as a total absence of reactance. Ideally the total impedance is equal to zero, but in actual practice there remains a small resistance component, on the order of only a few ohms.

In the illustrated embodiment conductor 13 accepts collector lead 5 from transistor 1. Since for the vast majority of transistors, a 100 mc. value is appropriate test frequency for measuring $f_t$, conductor 13 may be chosen to be approximately one-quarter wavelength for such a frequency. Should another frequency be used as a test frequency, the length of conductor 13 would have to be changed accordingly.

In an actual embodiment, a length slightly shorter than one-quarter wavelength has been used with a parallel capacitor-resistor combination placed across center lead 5 and conductor 13 to allow appropriate tuning.

For this combination, the reflected impedance (all resistance when the circuit is tuned to resonance) may be calculated from the following formula:

$$\frac{(Z_o)^2}{R} = R_e$$

Where $Z_o$ equals the characteristics impedance of the coaxial connector; R equals the value of the parallel resistor placed across the center lead to the outer shield; and $R_e$ equals the equivalent resistance reflected in the collector lead of the circuit.

To demonstate typical values by example, assume $Z_o$ equals 50 ohms and an inserted R equals 1200 ohms. Then $R_e$ would equal to $$\frac{(50)^2}{1200} = \frac{2500}{1200} = 2+$$

DC bias supply 33, which may be any convenient source such as a battery, may be connected between ground 57 and the negative connection of meter 39 so as to place a positive potential on the collector of the transistor, shown as an npn type. For a pnp transistor, of course, opposite biasing would be required.

Bias supply 33 has an inherent internal capacitance across its terminals, caused by the plates between the cells of the battery and the like, which may be represented as capacitance 59. At the high operating frequencies present under the testing conditions, capacitance 59 provides a reactance current path around the battery, but at a given test frequency the reactance will be a constant value. Therefore, the current flow through the collector current meter must be inilitally zeroes to compensate for such introduced impedance before the collector current is used in calculating $h_{fe}$ or $f_t$.

Another inherent capacitance present and ordinarily troublesome in testing under high-frequency conditions is the interelectrode capacitance between base and ground. This is because some of the current that would normally flow through the base current meter flows around it, thereby degrading the measurement.

In the illustrated embodiment, the connection of oscillator 27 to the circuit as described above effectively places a shield 61 around characteristic impedance 43 and meter 41. Even though a part of the signal from oscillator 27 is divided so as to find a return path to ground 57 through shield 61 and stray capacitance 63, there is no interference with the current flowing through impedance 43 and hence through base 3.

Operation

The test setup may be initially zeroed before the insertion of the transistor to be tested by placing a short connection across the base connection and collector connection. This establishes a continuous path wherein current flow should theoretically be equal. Should there be a discrepancy between the meter readings the meters may be zeored to reflect the unity conditions.

It may also be observed that when the short is removed and before the transistor is inserted, base current meter 41 indicates substantially zero, indicating that the leakage into the measured base circuit is zero. The terminals of base meter 41 are at a potential of the high frequency signal from oscillator 27 with respect to ground, but the measurement of the current by base meter 41 is still accurate.

When transistor 1 is placed into the circuit to be tested, it should be fully seated into the receiving ends of conductors 9, 11, and 13. When properly seated, the ratio of the reading of collector current meter 39 to the reading of base current meter 41 is an indication of $h_{fe}$. However, since it is possible to set the base current to a fixed or standard value, for instance 1 microampere, it is possible to calibrate meter 39 directly in terms of $h_{fe}$, the scale being linear.

As described above, there is a degenerative feedback connection 45 from base current meter 41 to oscillator 27 which automatically stabilizes the base current at a value set by the output of oscillator 27. As can be seen in FIG. 3, this is because the DC voltage established across impedance 43 is proportional to the base current.

Successful operation can be had without such a connection by either measuring the actual base and collector currents and calculating the ratio therefrom, or by providing an oscillator with an adjustable control for reestablishing the base current to a value of unity should it drift off.

The measurement of voltage on the order microvolts may be made by voltage meter 49, which may conveniently be a heterodyne detector. When corrected for the few microvolt drop across base coaxial conductor 9 and and base lead 3 (which is the reading across shunt capacitance 63 when the base and collector terminals are shorted during setup), meter 49 accurately indicates the voltage between the base and emitter terminals.

Because the input impedance is equal to the corrected $V_{BE}$ reading of meter 49 divided by the base current reading of meter 41 and since the base current is maintained constant, it is possible to directly calibrate meter 49 in terms of input impedance.

Also, it is possible to vary, within a limited degree the tuning of equivalent quarter wave connector 19. A method which may be used is the placement of a parallel combination of a resistor and a capacitor between the internal lead and shield of the conductor cut to slightly less than one quarter wavelength. Voltmeter 49 then may be placed in parallel across the whole combination. The capacitor is made tunable for precisely balancing out the reactance components of the quarterwave connector at the actual operating frequency of oscillator 27.

While several embodiments of the invention have been described, it is obvious that various substitutes or modifications of structure may be made without varying from the scope of the invention.

What is claimed is:

1. Apparatus suitable for measuring circuit parameters at a microwave test frequency in a three-element semiconductor device having base, collector and emitter leads, comprising first, second and third tubular conductors having insulating means therein, each of said means being adapted to receive an internal lead, said first conductor receiving the emitter lead of the device, said second conductor receiving the collector lead of the device, and said third conductor receiving the base lead of the device such that the receiving end of each of said three conductors is essentially contiguous with the device, said leads being insulating spaced from said tubular conductors, the length of said second conductor being substantially equal to one-quarter wavelength of the test frequency, the receiving ends of said first and second conductors being connected together, the receiving end of said third conductor being separated therefrom, said first, second and third conductors being connected together at a distance from the device so as to form an effective inductance loop, DC bias means adapted to be connected to the emitter lead of the device and said first conductor at the end of said first conductor opposite the device, oscillator means tuned to the measuring frequency adapted to be coaxially connected to said third conductor at a point near the end of said third conductor near the device, first current metering means having a terminal impedance substantially equal to the characteristic impedance of said third conductor adapted to be connected between said third conductor and the base lead of the device at the end of said third conductor opposite the device, and second current metering means adapted to be connected between the collector lead of the device at the end of said third conductor opposite from the device and said DC bias means, whereby, the base current and collector current may be accurately measured.

2. Apparatus in accordance with claim 1, wherein the signal measured by said first current metering means is applied degeneratively to said oscillator means so as to stabilize the current in the base lead at a constant value.

3. Apparatus in accordance with claim 1, wherein voltage metering means is connected through a coaxial connector such that the internal lead of said coaxial connection is connected between said third conductor at a point near the end of said third conductor and ground and the outer conductor of said coaxial connector is connected to said first and second conductors at their receiving ends.

4. In a testing device suitable for measuring parameters in a semiconductor device under high frequency conditions, the combination of conductive shields adapted to surround all the leads from the device, and having means therein for supporting each of said leads in insulated relationship to said shields, the receiving ends of said shields being substantially contiguous with the device, all but at least one of said shields being connected together at the end of said shields receiving the leads from the device, all of said shields being connected together at a point removed from the device so that an inductance loop is formed including the one of said shields not connected to the others at their receiving ends, the connection connecting all shields together, and the shields of those being connected at their receiving ends, a DC bias source adapted to be connected to the appropriate one of the leads from the device at the end opposite from the receiving end to condition the device for operation, a coaxial conductor having an internal connector connected near the receiving end to the one of said shields not connected to the others at their receiving ends and an outer connector connected to the remainder of said shields near their receiving ends, oscillator means tuned to the measuring frequency adapted to be applied to the internal connector of said coaxial conductor at the end opposite from its connection to the shield, and current metering means adapted to be connected to the appropriate ones of the leads from the device at the ends opposite from their receiving ends.

5. Apparatus suitable for measuring circuit parameters at a microwave test frequency in a three-element semiconductor device having base, collector and emitter leads, comprising first, second and third tubular conductors having insulating means therein, each of said means being adapted to receive an internal lead, said first conductor receiving the emitter lead of the device, said second conductor receiving the collector lead of the device, and said third conductor receiving the base lead of the device such that the receiving end of each of said three conductors is essentially contiguous with the device, said leads being insulatingly spaced from said tubular conductors, the receiving ends of said first and second conductors being connected together, the receiving end of said third conductor being separate therefrom, said first, second and third conductors being connected together at a distance from the device so as to form an effective inductance loop, DC bias means adapted to be connected to the emitter lead of the device and said first conductor at the end of said first conductor opposite the device, oscillator means tuned to the measuring frequency adapted to be coaxially connected to said third conductor at a point near the end of said third conductor near the device, first current metering means having a terminal impedance substantially equal to the characteristic impedance of said third conductor adapted to be connected between said third conductor and the base lead of the device at the end of said third conductor opposite the device, and second current metering means having a terminal impedance substantially equal to the characteristic impedance of said second conductor adapted to be connected between the collector lead of the device at the end of said third conductor opposite from the device and said DC bias means, whereby, the base current and collector current may be accurately measured.

6. Apparatus in accordance with claim 5, wherein the signal measured by said first current metering means is applied degeneratively to said oscillator means so as to stabilize the current in the base lead at a constant value.

7. Apparatus in accordance with claim 5, wherein voltage metering means is connected through a coaxial connector such that the internal lead of said coaxial connection is connected between said third conductor at a point near the end of said third conductor and ground and the outer conductor of said coaxial connector is connected to said first and second conductors at their receiving ends.

8. In a testing device suitable for measuring parameters in a semiconductor device under high frequency conditions, the combination of conductive shields adapted to surround all the leads from the device, and having means therein for supporting each of said leads in insulated relationship to said shields, the receiving ends of said shields being substantially contiguous with the device, all but at least one of said shields being connected together at the end of said shields receiving the leads from the device, all of said shields being connected together at a point removed from the device so that an inductance loop is formed including the one of said shields not connected to the others at their receiving ends, the connection connecting all shields together, and the shields of those being connected at their receiving ends, said inductance loop being suitable for having impressed therein a driving test current by transformer action from an exciting source, a DC bias source adapted to be connected to the appropriate one of the leads from the device at the end opposite from the receiving end to condition the device for operation, and current metering means adapted to be connected to the appropriate ones of the leads from the device at the ends opposite from their receiving ends.

9. Apparatus suitable for measuring circuit parameters at a microwave test frequency in a three-element semiconductor device having base, collector and emitter leads, comprising first, second and third tubular conductors having insulating means therein, each of said means being adapted to receive an internal lead, said first conductor receiving the emitter lead of the device, said second conductor receiving the collector lead of the device, and said third conductor receiving the base lead of the device such that the receiving end of each of said three conductors is essentially contiguous with the device, said leads being insulating spaced from said tubular conductors, the length of said second conductor being substantially equal to one-quarter wavelength of the test frequency, the receiving ends of said first and second conductors being connected together, the receiving end of said third conductor being separated therefrom, said first, second and third conductors being connected together at a distance from the device so as to form an effective inductance loop, DC bias means adapted to be connected to the emitter lead of the device and said first conductor at the end of said first conductor opposite the device, voltage generating means operating at the measuring frequency adapted to be coaxially connected to said third conductor at a point near the end of said third conductor near the device, first current metering means having a terminal impedance substantially equal to the characteristic impedance of said third conductor adapted to be connected between said third conductor and the base lead of the device at the end of said third conductor opposite the device, and second current metering means adapted to be connected between the collector lead of the device at the end of said third conductor opposite from the device and said DC bias means, whereby, the base current and collector current may be accurately measured.

10. Apparatus in accordance with claim 9, wherein the signal measured by said first current metering means is applied degeneratively to said voltage generating means so as to stabilize the current in the base lead at a constant value.

11. Apparatus in accordance with claim 9, wherein voltage metering means is connected through a coaxial connector such that the internal lead of said coaxial connection is connected between said third conductor at a point near the end of said third conductor and ground and the outer conductor of said coaxial connector is connected to said first and second conductors at their receiving ends.

12. Apparatus suitable for measuring circuit parameters at a microwave test frequency in a three-element semi-conductor device having base, collector and emitter leads, comprising first, second and third tubular conductors having insulating means therein, each of said means being adapted to receive an internal lead, said first conductor receiving the emitter lead of the device, said second conductor receiving the collector lead of the device, and said third conductor receiving the base lead of the device such that the receiving end of each of said three conductors is essentially contiguous with the device, said leads being insulatingly spaced from said tubular conductors, the receiving ends of said first and second conductors being connected together, the receiving end of said third conductor being separate therefrom, said first, second and third conductors being connected together at a distance from the device so as to form an effective inductance loop, DC bias means adapted to be connected to the emitter lead of the device and said first conductor at the end of said first conductor opposite the device, voltage generating means operating at the measuring frequency adapted to be coaxially connected to said third conductor at a point near the end of said third conductor near the device, first current metering means having a terminal impedance substantially equal to the characteristic impedance of said third conductor adapted to be connected between said third conductor and the base lead of the device at the end of said third conductor opposite the device, and second current metering means having a terminal impedance substantially equal to the characteristic impedance of said second conductor adapted to be connected between the collector lead of the device at the end of said third conductor opposite from the device and said DC bias means, whereby, the base current and collector current may be accurately measured.

13. Apparatus in accordance with claim 12, wherein the signal measured by said first current metering means is applied degeneratively to said voltage generating means so as to stabilize the current in the base lead at a constant value.

14. Apparatus in accordance with claim 12, wherein voltage metering means is connected through a coaxial connector such that the internal lead of said coaxial connection is connected between said third conductor at a point near the end of said third conductor and ground and the outer conductor of said coaxial connector is connected to said first and second conductors at their receiving ends.

15. In a testing device suitable for measuring parameters in a semi-conductor device under high frequency conditions, the combination of conductive shields adapted to surround all the leads from the device, and having means therein for supporting each of said leads in insulated relationship to said shields, the receiving ends of said shields being substantially contiguous with the device, all but at least one of said shields being connected together at the end of said shields receiving the leads from the device, all of said shields being connected together at a point removed from the device so that an inductance loop is formed including the one of said shields not connected to the others at their receiving ends, the connection connecting all shields together, and the shields of those being connected at their receiving ends, a DC bias source adapted to be connected to the appropriate one of the leads from the device at the end opposite from the receiving end to condition the device for operation, a coaxial conductor having an internal connector connected near the receiving end to the one of said shields not connected to the others at their receiving ends and an outer connector connected to the remainder of said shields near their receiving ends, voltage generating means operating at the measuring frequency adapted to be applied to the internal connector of said coaxial conductor at the end opposite from its connection to the shield, and current metering means adapted to be connected to the appropriate ones of the leads from the device at the ends opposite from their receiving ends.

References Cited

The Institution of Electrical Engineers, March 1960, pages 945–950.

RUDOLPH V. ROLINEC, *Primary Examiner.*

E. L. STOLARUN, *Assistant Examiner.*